United States Patent
Mace et al.

(10) Patent No.: US 6,534,573 B1
(45) Date of Patent: Mar. 18, 2003

(54) WAX COMPOSITIONS COMPRISING WAX AND OIL

(75) Inventors: Jean-Michel Mace, Louvain-la-Neuve (BE); Olivier Roumache, Louvain-la-Neuve (BE)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/537,614

(22) Filed: Mar. 29, 2000

(30) Foreign Application Priority Data

Mar. 31, 1999 (EP) .............................................. 99302573

(51) Int. Cl.⁷ .............................. C08J 5/10; C08L 91/06
(52) U.S. Cl. ........................................ 524/277; 524/275
(58) Field of Search ................................ 524/275, 277, 524/278, 279

(56) References Cited

U.S. PATENT DOCUMENTS

| | | | |
|---|---|---|---|
| 3,554,950 A | 1/1971 | Sauer | |
| 3,661,826 A | 5/1972 | Meier | 260/28.5 B |
| 3,772,234 A | 11/1973 | Porter | 260/28.5 B |
| 3,857,805 A | 12/1974 | Prickril | |
| 4,032,492 A | 6/1977 | Englund et al. | 260/28.5 A |
| 4,060,569 A | 11/1977 | Woods et al. | 260/683.15 R |
| 4,224,204 A | 9/1980 | Nichols et al. | |
| 4,239,546 A | 12/1980 | Russell et al. | 106/270 |
| H1186 H * | 5/1993 | Gelles | 428/355 |
| 5,368,946 A * | 11/1994 | Bohme et al. | 428/484 |

* cited by examiner

*Primary Examiner*—James J. Seidleck
*Assistant Examiner*—U. K. Rajguru
(74) *Attorney, Agent, or Firm*—Donald F. Haas

(57) ABSTRACT

The present invention provides a method for reducing bleeding number in wax compositions comprising wax and oil, wherein said waxes are selected from petroleum and synthetic waxes and said oil is present in the range of 1 to 45% w/w, by incorporating in the composition an effective amount of an oil retention agent in the form of an elastomeric polymer. The invention has particularly useful application to wax compositions used for wax candles. The invention further provides the use of elastomeric polymers for reducing bleeding number in wax compositions.

8 Claims, No Drawings

WAX COMPOSITIONS COMPRISING WAX AND OIL

FIELD OF THE INVENTION

The present invention relates to wax compositions comprising wax and oil.

BACKGROUND OF THE INVENTION

Fully refined petroleum waxes have numerous industrial applications including use in adhesives, candlemaking, food coatings, lubricants, paper coatings and waterproofing.

In a typical sequence of wax production, long residue is subjected to vacuum distillation, leading to spindle oil distillate, light machine oil distillate, medium machine oil distillate and distillation residue as typical products. Such products may be subjected to solvent refining and de-waxing to yield wax products such as spindle oil slack wax (SPO wax), light machine oil slack wax (LMO wax), medium machine oil slack wax (MMO wax) and bright stock slack wax (BSO) wax. These waxes may be treated by re-pulping processes, typically leading to waxes having >3% w/w oil content, or solvent de-oiling, typically leading to waxes having <1% w/w oil content.

The initial de-waxing stage removes a relatively small proportion of wax from a large proportion of oil. This operation is usually performed by 'solvent de-waxing' in which the waxy feed is mixed with a blend of solvents, chilled to crystallise the wax, and then filtered to remove the wax. At this stage SPO wax, LMO wax, MMO wax and BSO wax fractions usually contain between 10 to 35% w/w oil.

The presence of oil in a petroleum wax has a negative influence on its final properties. As the oil content increases, the tensile strength, hardness and resistance to scuffing are impaired. The oil content of such waxes may cause staining upon contact with paper.

In candlemaking, for example, the presence of excess oil can result in both the candles bending and dripping during use at ambient temperature and also tacking/sticking during storage at room temperature.

In order to mitigate the negative effects that oil impart on the wax, de-waxing is usually followed by an expensive de-oiling step to reduce the oil contents to typical levels of <1% w/w. This is usually achieved by a 'solvent de-oiling' process. Solvent de-oiling is essentially similar to solvent de-waxing but is designed to remove a relatively small amount of oil from a larger proportion of wax. The operation is controlled to produce a wax of the required oil content and melting point. An older 'sweating' process can be used to de-oil coarsely crystalline paraffin waxes. The sweating process results in a crude fractionation of the wax components wherein lower melting point waxes are removed along with the oil.

The Foots oil (approximately 12–20% w/w) that results from such de-oiling processes is normally sent to a cat-cracker. Hence solvent de-oiling is both a costly and wasteful process.

The tendency of a wax to 'bleed' or sweat oil can be evaluated by determining its bleeding number. Tests for assessing the bleeding number of petroleum waxes are known in the art and are described, for example, in *Petroleum Refiner*, 1948, Vol. 27, No. 8, pp429–431.

It is highly desirable to be able to produce waxes that do not 'bleed' or sweat oil, without having to employ the full de-oiling process.

SUMMARY OF THE INVENTION

The present invention provides a method for reducing the bleeding number of wax compositions comprising wax and oil, wherein said waxes are selected from petroleum and synthetic waxes and said oil is present in the range of 1 to 45 percent by weight (% w/w), by incorporating in the composition an effective amount of an oil retention agent in the form of an elastomeric polymer. The invention has particularly useful application to wax compositions used for wax candles. The invention further provides the use of elastomeric polymers for reducing bleeding number in wax compositions.

DETAILED DESCRIPTION OF THE INVENTION

The present invention provides a method for reducing bleeding number in petroleum and synthetic wax compositions containing wax and oil, wherein an oil retention agent in the form of an elastomeric polymer is incorporated in the composition. The incorporation of elastomeric polymer makes it feasible to avoid having to fully de-oil the wax prior to use, depending upon the bleeding tendency required in the composition.

Examples of waxes that can be treated by the invention are paraffin waxes and paraffin wax blends, preferably SPO, LMO, MMO and BSO waxes.

The process can be equally applied to synthetic waxes, such as Fischer-Tropsch (FT) waxes. Said FT waxes are hydrocarbon waxes that are produced by the reaction of carbon monoxide and hydrogen in the presence of a catalyst.

Petroleum and synthetic waxes that may be conveniently treated by the present invention preferably have an oil content in the range of from 1 to 35% w/w and most preferably in the range of from 1.5 to 15% w/w.

Elastomeric polymers are generally associated with polymers of conjugated dienes, such as butadiene or isoprene, or with copolymers of conjugated dienes with another copolymerisable monomer for example a mono vinyl aromatic hydrocarbon, such as styrene. It is emphasised that the elastomeric polymer used in the present invention is not restricted to such polymers or copolymers and may include any polymer with elastomeric (i.e. rubbery) properties. Suitable elastomeric polymers include elastomeric polymers of olefins, diolefins and cyclic olefins amongst others those that have been produced using metallocene catalysts (metallocene polymers). However, the polymers of conjugated dienes, or copolymers of dienes are the preferred elastomeric polymers in respect of this invention. These polymers may be random and/or block copolymers.

The preferred elastomeric polymers in respect of this invention are block copolymers of at least one mono vinyl aromatic monomer and at least one conjugated diene. More preferably, the block copolymer contains at least one predominantly poly(mono vinyl aromatic) block and at least one predominantly poly(conjugated) diene block. Optionally, the poly(conjugated diene) block may be completely, partially or selectively hydrogenated.

With the term "predominantly" is meant that the main monomer of the respective individual blocks optionally may be mixed with minor amounts (e.g. amounts less than 50% mol/mol) of another comonomer and more in particular with minor amounts of the main monomer of other blocks.

Examples of the mono vinyl aromatic monomers may be selected from styrene, α-methylstyrene, p-methylstyrene, m-methylstyrene, o-methylstyrene, p-tert-butylstyrene, dimethylstyrene, and various other alkyl-substituted styrenes, alkoxy-substituted styrenes vinylnaphthalene and vinyl xylene. The alkyl and alkoxy groups of the alkyl-substituted or alkoxy substituted styrenes respectively preferably contain from 1 to 6 carbon atoms, preferably from 1 to 4 carbon atoms. The conjugated diene monomers are preferably conjugated dienes with from 4 to 8 carbon atoms per monomer, for example, butadiene, isoprene, 2-ethyl-1,3-butadiene, 2,3-dimethyl-1,3-butadiene, 1,3-butadiene, 1,3-pentadiene, 2,4-hexadiene, 3-ethyl-1,3-pentadiene, and mixtures thereof.

Of these monomers styrene is the preferred vinyl aromatic monomer. Butadiene or isoprene or mixtures thereof are the preferred conjugated dienes. Block copolymers which contain only substantially pure poly(butadiene) or pure poly(isoprene) blocks are particularly preferred.

The apparent molecular weight of the elastomeric polymer may conveniently be in the range of from 20,000 to 750,000 and preferably in the range of from 40,000 to 730,000 and more preferably in the range of from 60,000 to 700,000.

With the term "apparent molecular weight" as used throughout the specification is meant the molecular weight of a polymer, as measured with gel permeation chromatography (GPC) using poly(styrene) calibration standards (according to ASTM D 3536).

The elastomeric block copolymers may be linear triblock or multiblock copolymers or multi-armed or star shaped symmetrical or unsymmetrical block copolymers. Diblock copolymers may also be used, as well as mixtures of block copolymers such as triblock copolymers containing diblock copolymers.

The elastomeric block copolymers, which are incorporated in wax compositions described herein, may be prepared by any method known in the art including the well known full sequential polymerisation method, optionally in combination with reinitiation, and a coupling method, as illustrated in e.g. U.S. Pat. No. 3,231,635; U.S. Pat. No. 3,251,905; U.S. Pat. No. 3,390,207; U.S. Pat. No. 3,598,887; U.S. Pat. No. 4,219,627; EP-A-0,413,294; EP-A-0,387,671; EP-A-0,636,654; and WO 04/22931, all of which are herein incorporated by reference. Examples of coupling agents used in this coupling method are, for example, dibromoethane, silicon tetrachloride, diethyl adipate, divinylbenzene, dimethyldichlorosilane, methyldichlorosilane. Particularly preferred in such a preparation route is the use of non-halogen containing coupling agents, for example gamma-glycidoxypropyl-trimethoxysilane, and diglycidylether of bisphenol A (EPON® 825 resin).

The vinyl aromatic monomer content of the elastomeric polymer is preferably in the range of from 0 to 70% w/w, more preferably from above 0 to 50% w/w.

As indicated above, the elastomeric polymer may and indeed preferably is a hydrogenated block copolymer. The elastomeric polymer may be hydrogenated by any suitable technique. The hydrogenation may be complete or partial. In addition, it is possible to selectively hydrogenate just the non-aromatic (i.e. ethylenic) unsaturation so as to convert, e.g. a polyisoprene block to an ethylene propylene rubber (EPR) block.

The poly(conjugated diene) blocks can be hydrogenated up to a substantial degree, i.e. more than 80% of the original ethylenic unsaturation has been hydrogenated. According to the preferred embodiment of the present invention, the poly(conjugated diene) blocks have been hydrogenated up to a residual ethylenic unsaturation (RU) of at most 10%, and most preferably less than 5%.

Examples of elastomeric polymers which can be conveniently used in the present invention include elastomeric block copolymers sold under the trademarks KRATON® D and G polymers, preferably KRATON® elastomeric block polymers sold under the trade designations of KRATON® D1102, G1650, G1652, G1654, G1657, G1726, G1750, and G1780 polymers are used. Suitable metallocene polymers that may be used in the course of the present invention include those sold under the trade designations ENGAGE® 8200 and EXACT® 4049 polymers.

It will be appreciated that mixtures of elastomeric polymers may also be incorporated in the wax composition.

For cost reasons, the amount of elastomeric polymer incorporated in the wax composition in order to reduce bleeding number will generally be kept as low as possible. The amount of elastomeric polymer incorporated in the wax composition is preferably in the range of from 0.1 to 10% w/w, and more preferably in the range of from 0.1 to 5% w/w based on wax composition.

The incorporation of elastomeric polymer in the wax composition is preferably in an amount such as to reduce the bleeding number of the wax composition by at least 10%, preferably at least 30% and more preferably at least 50%, measured at a temperature of generally at least 30° C., preferably at least 35° C., more preferably at least 40° C. and most preferably at least 45° C. Most preferably, the elastomeric polymer is incorporated in an amount sufficient to reduce the bleeding number of the wax composition to generally less than 8 mm, preferably less than 6 mm, more preferably less than 2 mm and most preferably 0 mm, measured at a temperature of generally at least 30° C., preferably at least 35° C., more preferably at least 40° C. and most preferably at least 45° C. Moreover, the incorporation of elastomeric polymers in wax compositions can significantly increase the hardness of the waxes produced.

Incorporation of the elastomeric polymer in the wax composition is preferably done in a manner which achieves a homogeneous or substantially homogeneous incorporation of the polymer into the wax. This may conveniently be achieved by physical blending.

Blending of elastomeric polymers into wax compositions requires the combination of a suitable degree of shear at a suitable temperature. As the amount of elastomeric polymer present in the composition will be low, the temperature is the most significant parameter. But, to reduce the blending time it is necessary to apply some mechanical shear. Thus, temperature is the more significant parameter and little or no mechanical shear may be necessary.

This minimum operating temperature is strongly related to the molecular weight of the wax and that of the elastomeric polymer; in particular that of the polystyrene endblock when a polystyrene-containing block copolymer is used. The temperature will usually be the maximum temperature the wax can withstand with a maximum of 250° C. As an example, a 30° C. wax, that is to say a wax with a melting point of 30° C., will require 120° C. with a low molecular weight elastomeric polymer and 190° C. with a high molecular weight elastomeric polymer.

The use of a high shear mixer makes it possible to work at temperature slightly lower than usually needed for a conventional mixer.

For instance, the modification of the wax may be performed with a high shear rotor/stator mixer equipment. Many other techniques may also be employed to provide a homogeneous wax/elastomeric polymer composition, including but not limited to the use of internal mixer, Z-blade and extruder (screw has to be designed for super low viscosities) equipment.

Wax compositions described in the present invention can be conveniently used in a wide range of applications. The present invention can be suitably employed in traditional wax applications wherein oil retention is an important feature of use. Use of wax compositions provided by the present invention includes candles, adhesives, dipping, carbon papers, crayons, dental modelling, food coating, matches, packaging material, polishes, electrical specialities, metal casting, moisture resistance, binders and metal injection moulding.

The wax composition can be further combined with other additives including but not limited to stearic acid, mould releases, colourants, dyes, odourants, UV inhibitors, modifiers and hardening resins.

In a preferred embodiment of the invention said compositions are employed in the production of wax candles.

Candles are typically made by casting, compression, dipping, drawing, extrusion, moulding, pouring or rolling processes. Household candles are usually made by moulding processes.

Wax candles produced according to the present invention can be dip-coated with a higher melting point wax in order to reduce dripping.

The present invention can be applied to the production of all types of wax candles, including for example church candles, shaped decorative candles, porch light lantern candles and night lights.

The invention is illustrated by the following examples, which should not be regarded as limiting the scope of the invention in any way.

EXAMPLES

TABLE 1

Elastomeric Polymers.

| Polymer[1] | Material Description |
| --- | --- |
| KD1102 | S-B-S polymer of linear structure with a polystyrene content of about 30% w/w and a medium apparent molecular weight. |
| KG1650 | S-E/B-S polymer of linear structure with a polystyrene content of about 30% w/w and a medium apparent molecular weight. |
| KG1652 | S-E/B-S polymer of linear structure with a polystyrene content of about 30% w/w and a low apparent molecular weight. |
| KG1657 | S-E/B-S di-block containing polymer of linear structure with a polystyrene content of about 15% w/w and a medium apparent molecular weight. |
| KG1750 | (EP)$_n$ polymer of multi-arm structure with a high apparent molecular weight. |
| KG1780 | (S-EP)$_n$ polymer of multi-arm structure with a polystyrene content of 7% w/w and a high apparent molecular weight. |
| ENGAGE ® 8200 | Saturated ethylene-octene copolymer. |
| EXACT ® 4049 | Saturated ethylene-butene copolymer. |

[1]The KD and KG polymers are grades of block copolymers sold under the trademark KRATON ® by Shell Chemical Company.

In the above Table 1, S-B-S refers to a styrene-butadiene-styrene block copolymer, S-E/B-S refers to a styrene-ethylene/butylene-styrene block copolymer, (EP)$_n$ refers to an ethylene/propylene multi-arm copolymer and (S-EP)$_n$ refers to an styrene-ethylene/propylene multi-arm copolymer.

Table 1 details some of the elastomeric polymers that have been tested in wax compositions. For the purposes of Table 1, apparent molecular weights are defined as high, medium or low, wherein low corresponds to apparent molecular weights of less than 100,000, medium corresponds to apparent molecular weights in the range of from 100,000 to 150,000 and high corresponds to apparent molecular weights of greater than 150,000.

TABLE 2

Analysis of Scale Waxes.

| | Wax | |
| --- | --- | --- |
| Characteristic | EXXON SW 130 | SHELL SW 250 |
| Congealing Point, ° C. (ASTM D 938) | 51.0 | 57.2 |
| PEN at 25° C., 0.1 mm (IP 376/86(95)) | 48 | 17.0 |
| Saybolt colour (ASTM D 156) | +24 | |
| Oil Content, % w/w (ASTM D 721) | 2.9 | 4.8 |
| Odour (rating 1–4) (ASTM D 1833) | 2.5 | |

The characteristics of EXXON® SW 130 and SHELL® SW 250 waxes that were used in testing are detailed in Table 2. The modification of the wax (200 g) was performed in a 400 ml beaker with a high shear rotar/stator mixer equipment (IKA, ULTRA-TURAX). The polymer was dispersed into the wax preheated to 120° C. with a heated oil bath and mixed at 2000 rpm until visibly homogeneous.

Testing

The drop point is the temperature at which the material becomes fluid enough to drop out of a 2.8 mm diameter bottom hole cup. The drop point was measured using a METTLER FP Thermosystem with a temperature sweep of 1° C. per minute.

The disposition of the petroleum waxes to stain was assessed by the following bleeding test, which is similar to that described in *Petroleum Refiner*, 1948. Vol. 27, No. 8, pp429–431, referred to above.

Prior to testing the wax under investigation was heated up to 95° C. and then cooled until the sample was 10° C. above the melting point temperature. The bleeding number was measured by allowing a droplet of said liquid wax (diameter 6–8 mm) to fall onto a sheet or a filter paper (WHATMAN No. 50, 12.5 cm diameter) and congeal. The sample was placed in an oven at a temperature from 30 to 45° C. for 24 hours. The bleeding number consists of measuring the diameter of the oil ring surrounding the droplet and in subtracting the diameter of the droplet of wax. At least three readings were taken in each case, wherein said differences did not vary by more than 1 mm.

Examples 1–6

TABLE 3

Effect of Elastomeric Polymers on Scale Wax SW 130 Properties.

| | | Wax SW 130 | | |
| --- | --- | --- | --- | --- |
| | Elastomeric Polymer | Drop Point Temperature | Bleeding Number (mm) | |
| Example | (2% w added) | (° C.) | 35° C. | 40° C. |
| Comparative 1 | none | 50 | 10 | 22 |
| 2 | KG 1650 | 63 | 0 | 4 |
| 3 | KG 1652 | 53 | 0 | 0 |
| 4 | KG 1780 | 52 | 0 | 0 |

TABLE 3-continued

Effect of Elastomeric Polymers on Scale Wax SW 130 Properties.

|  |  | Wax SW 130 | | |
| --- | --- | --- | --- | --- |
|  | Elastomeric Polymer | Drop Point Temperature | Bleeding Number (mm) | |
| Example | (2% w added) | (° C.) | 35° C. | 40° C. |
| 5 | KG 1657 | 51 | 0 | 0 |
| 6 | KG 1750 | 52 | 0 | 0 |

Table 3 details the results of bleeding number tests and drop point measurements for various KG elastomeric polymer/SW 130 wax compositions. Results are compared with unmodified SW 130 scale wax.

The modification of scale waxes containing less than 5% oil, with any KG polymer reduced the oil bleeding tremendously and improved the dry feel of the blends to a level matching that of a fully refined paraffin wax.

In Examples 2, 3, 4, 5 and 6, the addition of 2% w/w of a KG elastomeric polymer resulted in a bleeding number of 0 mm at normal operating temperature (35° C.) compared to unmodified SW 130 scale wax in Example 1 which exhibited a bleeding number of 10 mm under identical conditions.

2% w/w of these polymers caused at least a 30% reduction in bleeding number as compared to unmodified SW 250 wax.

In Example 12, the incorporation of an additional 1% w/w of elastomeric polymer (to give 3% w/w polymer content) was sufficient to further reduce the bleeding number to 0 mm at 45° C. upon addition of 3% w/w elastomeric polymer.

Examples 13 and 14 indicate the beneficial effect that the addition of a metallocene polymer to the wax composition has on the bleeding number. Both ENGAGE® 8200 and EXACT® 4049 polymers result in a bleeding number of 0 mm at 30° C. for the SW 250 wax composition. Metallocene polymers were also found to have a significant whitening effect on the wax composition produced.

In Example 15, a blend of KG 1780 and metallocene polymer, EXACT® 4049, 2:1% w/w, for whiter wax blend resulted in a bleeding number of 0 mm at higher temperatures of 45° C.

Candles

Candles were prepared from wax blends containing elastomeric polymer and compared to candles made from conventionally de-oiled slack waxes.

Deoiling of EXXON® Slackwax SW 130

EXXON® Slackwax SW 130 was deoiled under the following conditions:

TABLE 4

Examples 7–15
Effect of Elastomeric Polymers on Scale Wax SW 250 Properties.

| Example | Polymer Type | Polymer Concentration (% w/w) | Drop point test (° C.) | Hardness Shore A (0 sec.) | Bleeding Number (mm) | | | |
| --- | --- | --- | --- | --- | --- | --- | --- | --- |
|  |  |  |  |  | 30° C. | 35° C. | 40° C. | 45° C. |
| Comparative 7 | pure SW 250 | — | 58 | 33 | 2 | 6–4 | 10–7 | 12–10 |
| 8 | KD 1102 | 2 |  |  | 2 | 4–4 |  |  |
| 9 | KG 1650 | 2 | 69 | 49 | 0 | 0.5 | 4–4 | 5–7 |
| 10 | KG 1652 | 2 | 61 | 52 | 0 | 0.5 | 4–3 | 4–3 |
| 11 | KG 1657 | 2 | 60 | 55 | 0 | 0 | 1–2 | 1–2 |
| 12 | KG 1657 | 3 | 60 | 56 |  |  |  | 0 |
| 13 | ENGAGE ® 8200 | 2 | 60 |  | 0 | 1 | 8–8 | 8–8 |
| 14 | EXACT ® 4049 | 2 | 60 |  | 0 | 0 | 4–5 | 5–6 |
| 15 | Blend KG 1780 + EXACT ® 4049 | (2 + 1) |  |  |  |  |  | 0 |
| 16 | KG 1780 | 2 | 60 | 49 | 0 | 0 | 0 | 0 |

Table 4 details the results of bleeding number tests and drop point measurements for various KG and KD elastomeric polymer/SW 250 wax compositions. Results are compared with unmodified SW 250 scale wax.

Where several values appear in the bleeding number results, these indicate a bleeding number analysis that has been carried out on both the horizontal and vertical axes.

The results illustrate the effect of adding a small amount of elastomeric polymer to the wax composition on the bleeding number of said wax. The incorporation of elastomeric polymer generally causes a reduction in bleeding number when compared to the unmodified SW 250 wax compositions in Comparative Example 7.

The incorporation of 2% w/w of KG polymer to the wax composition in Examples 9–11 and 16, was sufficient to reduce bleeding number to 0 mm at 30° C. Even at elevated temperatures up to and including 45° C., the incorporation of

| Solvent: | MEK/toluene 60/40 v/v |
| --- | --- |
| Solvent/feed ratio: | 3:1 v/w |
| Wash/feed ratio: | 2:1 v/w |
| Deoiling temperature: | +5° C. |
| Wax recovery: 84.9% w, (Congealing point: 53.3° C.), Oil Content < 1% w/w | |

Candle Moulding

Candles (diameter 22 mm) were moulded from compositions containing SW 130 wax and 2% w/w of various elastomeric polymers. Similar candles were produced from deoiled EXXON® SW 130 slack wax (22 mm diameter).

Candles were moulded in glass pipes of internal diameter (ID) of 22 mm. Hot molten wax (ca. 100° C.) was poured into the ambient temperature glass pipes. A 'WEDO' flat wick, 3×9 yarns was used in all cases. When the wax started to crystallise, the pipes were placed in a water bath at ca. 20° C. for about 1 hour. If the candle formed would not release easily from the glass pipes, the pipes were put in ice for a further period (ca. 1 hour), until the candle could be easily removed.

Candle Burning Properties

Examples 16–18

After burning the tip of the candles, the candles' burning rates were observed for 2 hours. The candle was then extinguished. After a rest period of ca. 1 hour the burning test was continued for a further hour.

TABLE 5

Candle Burning Tests.

| Example | Candle | Diameter (mm) | First 2 hours Burning Time | | Next 1 hour Burning Time | |
|---|---|---|---|---|---|---|
| | | | Ave. Rate (g/hr) | Flame Size (mm) | Ave. Rate (g/hr) | Flame Size (mm) |
| Comp. 16 | Wax ex SW 130 | 22 | 7.3 | 45–50 | 6.8 | 45–50 |
| 17 | SW130 + KG1652 | 22 | 6.7 | ca. 40 | melted down | — |
| 18 | SW130 + KG1657 | 22 | 5.5 | 30–35 | 6.7 | ca. 35 |

Table 5 compares the burning characteristics of candles made from KG elastomeric polymer/SW 130 wax blends to those of fully de-oiled SW 130 slack wax. Wax blends containing elastomeric polymers as oil retention agents are suitable for burning and give comparable results to fully de-oiled slack waxes.

We claim:

1. Wax compositions comprising wax and oil wherein said waxes are selected from petroleum and synthetic waxes and said oil is present in the range of 1 to 45% w/w, and incorporated in the composition an effective amount of an oil retention agent in the form of an elastomeric polymer wherein the elastomeric polymer is a polymer of at least one conjugated diene or a copolymer of at least one mono vinyl aromatic monomer and at least one conjugated diene or a metallocene polymer.

2. A composition according to claim 1 wherein the elastomeric polymer is a block copolymer of styrene with butadiene or isoprene.

3. A composition according to claim 2 wherein the elastomeric polymer is a hydrogenated block copolymer.

4. A composition according to claim 1 wherein the styrene content of the elastomeric polymer is in the range of from 0 to 50% w/w.

5. A composition according to claim 4 wherein the amount of elastomeric polymer is in the range of from 0.1 to 10% w/w.

6. A composition according to claim 5 wherein the amount of elastomeric polymer is in the range of from 0.1 to 5% w/w.

7. A composition according to claim 1 wherein the amount of elastomeric polymer is such that the bleeding number is reduced by at least 30% measured at a temperature 30° C.

8. A composition according to claim 1 which is in the form of a candle.

* * * * *